US007327503B2

(12) United States Patent
Yashima et al.

(10) Patent No.: US 7,327,503 B2
(45) Date of Patent: Feb. 5, 2008

(54) IMAGE CORRECTION METHOD IN INKJET RECORDING APPARATUS

(75) Inventors: Masataka Yashima, Tokyo (JP); Noribuma Koitabashi, Kanagawa (JP); Tsuyoshi Shibata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 10/281,967

(22) Filed: Oct. 29, 2002

(65) Prior Publication Data

US 2003/0086100 A1 May 8, 2003

(30) Foreign Application Priority Data

Nov. 6, 2001 (JP) ............................ 2001-340614

(51) Int. Cl.
*H04N 1/52* (2006.01)
*H04N 1/54* (2006.01)
*G06K 15/10* (2006.01)

(52) U.S. Cl. ........................ 358/504; 358/1.8; 358/1.9; 358/505

(58) Field of Classification Search ..................... None
See application file for complete search history.

(56) References Cited

U.S. PATENT DOCUMENTS

| | | | | |
|---|---|---|---|---|
| 4,959,711 | A * | 9/1990 | Hung et al. | 358/523 |
| 5,343,231 | A * | 8/1994 | Suzuki | 347/14 |
| 5,528,270 | A | 6/1996 | Tajika et al. | |
| 5,581,284 | A | 12/1996 | Hermanson | |
| 5,724,259 | A * | 3/1998 | Seymour et al. | 382/199 |
| 6,033,054 | A * | 3/2000 | Takagi | 347/43 |
| 6,168,261 | B1 * | 1/2001 | Miyake et al. | 347/40 |
| 6,270,187 | B1 * | 8/2001 | Murcia et al. | 347/43 |
| 6,597,473 | B1 * | 7/2003 | Rasmussen et al. | 358/1.9 |
| 6,702,426 | B2 * | 3/2004 | Yashima | 347/43 |
| 6,707,579 | B1 * | 3/2004 | Komiya et al. | 358/3.1 |
| 6,834,927 | B2 * | 12/2004 | Yashima et al. | 347/15 |
| 6,908,176 | B2 * | 6/2005 | Koitabashi et al. | 347/43 |
| 6,953,238 | B2 * | 10/2005 | Koitabashi et al. | 347/43 |
| 7,085,002 | B2 * | 8/2006 | Ilbery et al. | 358/1.8 |
| 7,101,011 | B2 * | 9/2006 | Koitabashi et al. | 347/19 |
| 2003/0142162 | A1 * | 7/2003 | Barr et al. | 347/19 |
| 2004/0046811 | A1 * | 3/2004 | D'Souza et al. | 347/12 |

FOREIGN PATENT DOCUMENTS

| | | |
|---|---|---|
| EP | 0 983 855 | 3/2000 |
| EP | 1 010 531 | 6/2000 |
| EP | 1 060 896 | 12/2000 |
| EP | 1 151 867 | 11/2001 |

* cited by examiner

*Primary Examiner*—Twyler Lamb
*Assistant Examiner*—Myles D. Robinson
(74) *Attorney, Agent, or Firm*—Fitzpatrick, Cella, Harper & Scinto

(57) ABSTRACT

A method of preventing image degradation due to nonejecting nozzles of a recording head is provided for an inkjet recording apparatus for recording images by ejecting ink from plural nozzles disposed in the recording head. The method according to the present invention includes the steps of measuring and recording a pattern for checking an ejection state of the head, determining a nonejecting nozzle from the pattern, obtaining density distribution for each nozzle, and determining a complementary table for every nozzle from the density distribution in the nonejecting nozzle portion for performing different-color complementing.

10 Claims, 11 Drawing Sheets

| NOZZLE I.D. | NONEJECTION | DENSITY DISTRIBUTION | AFTER COMPUTATION | SHADING DATA |
|---|---|---|---|---|
| ⋮ | | ⋮ | ⋮ | ⋮ |
| 100 | | 127.9 | 124.7 | -3.8 |
| 101 | | 116.5 | 123.6 | -4.7 |
| 102 | | 123.0 | 124.1 | -4.2 |
| 103 | | 124.3 | 125.6 | -0.4 |
| 104 | | 134.2 | 124.7 | 2.3 |
| 105 | | 127.0 | 117.6 | -0.4 |
| 106 | | 117.6 | 104.9 | -20.5 |
| 107 | (A) | 41.8 | 97.4 | ** |
| 108 | | 126.0 | 104.3 | -16.6 |
| 109 | | 129.7 | 112.9 | -2.7 |
| 110 | | 109.0 | 115.6 | -9.0 |
| 111 | | 114.3 | 117.7 | -9.3 |
| 112 | | 123.0 | 121.2 | -3.9 |
| 113 | | 127.7 | 124.1 | -1.1 |
| 114 | | 123.9 | 126.0 | -2.1 |
| 115 | | 121.6 | 128.6 | -0.5 |
| 116 | | 138.4 | 132.1 | 4.4 |
| 117 | | 131.8 | 134.3 | 6.2 |
| 118 | | 137.5 | 134.5 | 6.7 |
| 119 | | 134.9 | 132.6 | 4.5 |
| 120 | | 123.4 | 129.6 | 0.8 |
| 121 | | 130.2 | 126.9 | 0.9 |
| 122 | | 128.5 | 123.5 | -1.3 |
| 123 | | 113.9 | 119.7 | -7.7 |
| 124 | | 112.4 | 119.0 | -8.1 |
| 125 | | 127.9 | 121.3 | -2.9 |
| 126 | | 125.1 | 123.4 | -1.5 |
| 127 | | 121.9 | 124.9 | -2.5 |
| 128 | | 125.9 | 127.2 | -0.0 |
| 129 | | 134.0 | 129.5 | 3.3 |
| 130 | | 130.6 | 130.3 | 2.9 |
| 131 | | 127.5 | 130.6 | 1.8 |
| 132 | | 131.8 | 131.3 | 3.1 |
| 133 | | 132.5 | 132.2 | 4.4 |
| 134 | | 133.5 | 132.3 | 5.1 |
| 135 | | 134.2 | 131.3 | 3.9 |
| 136 | | 125.6 | 129.9 | 1.5 |
| 137 | | 130.1 | 129.5 | 1.7 |
| 138 | | 130.6 | 130.1 | 2.2 |
| 139 | | 127.8 | 131.5 | 2.0 |
| 140 | | 131.7 | 134.5 | 4.5 |
| 141 | | 139.4 | 138.0 | 8.2 |
| 142 | | 139.1 | 139.9 | 10.3 |
| 143 | | 142.9 | 138.5 | 10.3 |
| 144 | | 135.4 | 131.8 | 7.5 |
| 145 | | 132.1 | 118.3 | 2.0 |
| 146 | | 118.4 | 97.9 | -24.9 |
| 147 | (B) | 12.2 | 84.0 | ** |
| 148 | | 110.8 | 91.2 | -30.3 |
| 149 | | 120.4 | 106.3 | -7.9 |
| 150 | | 116.1 | 117.1 | -6.9 |
| ⋮ | | ⋮ | ⋮ | ⋮ |

FIG. 9

IMAGE CORRECTION METHOD IN INKJET RECORDING APPARATUS

BACKGROUND OF THE INVENTION

1. Field of the Invention

The present invention relates to an image correction method for correcting a nonejection state, which is an inherent characteristic of each recording head of an inkjet recording system that ejects ink dots onto a recording medium to form an image thereon.

2. Description of the Related Art

Along with the popularization of copying machines, information processing equipment such as word processors and computers, and communication equipment, digital image-recording apparatus using inkjet recording heads have come into widespread use as image-forming (recording) apparatuses for the aforesaid equipment. Also, recent enhancements in image quality and colorization of visual information in the information processing equipment and communication equipment has necessitated concomitant enhancements in image quality and colorization in recording apparatuses.

In such a recording apparatus, for miniaturizing and speeding up the forming of a pixel, a plural-recording-elements integrated recording head (also referred to as a multi-head) is used, in which plural ink nozzles and ink paths are integrated in high density. Furthermore, for colorization, the apparatus generally has plural multi-heads corresponding to respective colors of cyan, magenta, yellow, and black. Using this structure, technology has strived to output high grade images at high speed and at low cost. In one method to increase speed, a one-pass high-speed method, in which the length of the multi-head is about the width of a recording medium, is coming into use.

For example, in transverse-feed page printers for A-4 size paper, the length of the multi-head is about 30 cm, and 7000 nozzles or more are required to achieve 600 dpi images. It is extremely difficult to manufacture such multi-heads having such a large number of nozzles without some defects. In addition, the nozzles will not necessarily have the same performance characteristics. Furthermore, some nozzles become incapable of ejection after being used. Therefore, it is worth noting head shading techniques for correcting density nonuniformity due to ejection-amount nonuniformity and deviations in landing position (kink), as well as nonejecting-nozzle correction (nonejection complementary) techniques for performing complementary processing on a nonejecting nozzle to enable even a multi-head with defects to be used.

Generally in head shading techniques, the density is measured for every nozzle and the input-image data is then corrected for the measured result. For example, if the ejection amount of one nozzle is reduced for some reason so as to reduce the density corresponding to that nozzle, this technique corrects the input image data so that a gradation value corresponding to the affected nozzle is increased so as to yield uniform density throughout the printed images.

The nonejection complementary technique, described in another U.S. patent application, (U.S. Ser. No. 845,498) assigned to the same assignee as this application, sets forth other methods for collecting nozzle output variations. If one nozzle for cyan is nonejecting, for example, methods for compensating for this ink shortage include (i) substituting with the ejection of nozzles on both sides of the nonejecting nozzle (adjacent complementation), (ii) complementing the nonejecting nozzle with an ink dot of another color, such as black, (different-color complementing), and (iii) distributing the data corresponding to the nonejecting nozzle to nozzles at both ends of the head.

The above-mentioned patent application is especially effective in a recording apparatus using a full-line head, which corresponds to those heads that span the entire width of the recording sheet.

With respect to the different-color complementing described above, a method has been proposed for determining the amount of the different-color ink to be complementarily ejected, which uses pixel-image density data (a gradation value) determined as a function of the number of successive nonejecting nozzles.

However, the different color complemented result often may vary from that anticipated, depending on the ejection condition of the adjacent nozzles. For example, when the amount of the ink ejected from the adjacent nozzles on both sides is large so as to increase the size of an ink dot, if the amount of different-color complementing ink is not reduced from the determined standard amount (hereinafter the amount of the complementing is referred to as a “reference different-color complementing amount”), the resultant complementing may become conspicuous due to the effect of the large number of ink dots adjacent to the nonejecting nozzle. That is, it is necessary to determine the amount of the different-color complementing by measuring the degree of the effect on the vicinity. This situation is shown in FIG. 1.

Solid lines in FIG. 1 show density changes when a zigzag pattern having a duty factor of 50% (a checker pattern, in which dots are recorded at a percentage of 50%) is formed with ink dots of about 60 μm at a resolution of 600 dpi. In the drawing, symbols (A1) to (A3) show the case that the dot diameter from the nozzles on both sides of the nonejecting nozzle is the same as that from other nozzles, and the number of successive nonejecting nozzles for each case is 1, 2, and 3, respectively. Symbols (B) and (D) show cases where the dot diameter from the nozzles on both sides are smaller by 4 μm and 7 μm, respectively. Symbols (C) and (E) show cases where the dot diameter from the nozzles on both sides are larger by 4 μm and 7 μm, respectively. In such a manner, it is understood that the density in the vicinity of the nonejecting nozzle is changed by the ink ejection characteristics of the nozzles on both sides.

When the ejection by the nozzles on both sides of the nonejecting nozzle is the same in dot diameter and dot density as that in the other nozzles, and only the landing position of the ejection is shifted in the nozzle-line direction (Y kink), the appearance is slightly different from the above-mentioned case in which the dot diameter is changed. Solid lines in FIG. 2 show density changes when the Y kink of the nozzles on both sides of the nonejecting nozzle is different, and similarly to FIG. 1, FIG. 2 shows a zigzag pattern having a duty factor of 50% and which is formed with ink dots of about 60 μm at a resolution of 600 dpi. In the drawing, symbols (A1) to (A3) show cases where there is no landing-position shift (Y kink) in the nozzles on both sides of the nonejecting nozzle. Symbols (B) and (D) show cases where the landing position of the nozzles on both sides are shifted by 7 μm and 14 μm in the direction opposite to the nonejecting nozzle, respectively. Symbols (C) and (E) show cases where the landing position of the nozzles on both sides are shifted by 7 μm and 14 μm, in the direction toward the nonejecting nozzle, respectively. Similar to the above-mentioned case, in which the dot diameter is different, the density in the nonejecting nozzle changes depending on conditions of the nozzles on both sides. However, when about five pixels are viewed in the vicinity of the nonejecting nozzle and including that nozzle, the respective amounts of ink are substantially the same, and only changes in the density corresponding to the nonejecting nozzle are apparent. Therefore, if the ejection by the nozzles on both sides of the nonejecting nozzle is the same in dot diameter and dot density as that by the other nozzles, and only the landing position of the ejection is shifted, the standard different-color complementary amount can substantially have the same advantages.

From these factors, the ejecting conditions of nozzles in the vicinity of the nonejecting nozzle, specifically dot density, dot diameter, and kink, can be comprehended, and then, if there are no fluctuations in the dot density and dot diameter, the complementing may be performed with the reference different-color complementing amount. However, if there are fluctuations in the dot density and dot diameter, the complementing must be performed with an amount increased or decreased from the reference different-color complementing amount by referring to the density of the nonejecting nozzle portion.

However, typical reading devices (scanner) scarcely read dot density and existence of an ink dot of approximately 60 μm; and as for the kink, although a kind of smaller kinks approximately several dozen μm can be recognized, especially those of several μm, cannot be recognized by the scanner.

It is not cost-effective to perform the correction with a high-efficiency scanner capable of reading the density, size, and position of an ink dot of several μm.

SUMMARY OF THE INVENTION

The present invention can provide an image correction method for correcting a nonejecting nozzle without using a high-efficiency scanner.

In the present invention, a pattern for reading an ejecting state of a head is recorded and analyzed so as to determine the presence of a nonejecting nozzle while density distribution data corresponding to each nozzle is obtained so as to determine a complementary table for each nozzle so as to perform different-color complementing with reference to the density distribution in the nonejecting nozzle.

Moreover, a suitable arithmetic calculation is performed on the density distribution data corresponding to each nozzle so as to determine a complementary table for each nozzle to perform the different-color complementing.

Specifically, an arithmetic calculation is performed on the density distribution data corresponding to each nozzle, and if the resultant value of the calculation on a nonejecting nozzle is larger than the reference set value, a complementary table is set so that the different-color complementary amount is larger than the value shown in the reference different-color complementary table. However, if the resultant value is smaller than the reference set value, a complementary table is set so that the different-color complementary amount is smaller than the value shown in the reference different-color complementary table.

According to one aspect of the present invention, an image correction method for an inkjet recording apparatus for recording images by ejecting ink on a recording medium using a recording head having a plurality of nozzles for ejecting ink arranged on the recording head includes the steps of outputting a pattern for measuring recording characteristics of the recording head, determining a nonejecting nozzle from the plurality of nozzles and obtaining a density distribution corresponding to each nozzle based on the measured density of the output pattern, determining a complementary table for each nozzle for complementing with a color different from the color corresponding to the nonejecting nozzle by comparing the obtained density distribution corresponding to the nonejecting nozzle with a reference preset value and converting image data corresponding to the nonejecting nozzle into different-color image data for ejection by another nozzle using determined complementary table. The reference preset value is a value of the density distribution corresponding to the nonejecting nozzle in a state that sizes and density of ink drops ejected from nozzles in the vicinity of the nonejecting nozzle are constant and there is no deviation in a landing position. One of a table and a function showing a complementary amount with the different color in the state for each gradation value of input images is prepared for each number of consecutive nonejecting nozzles as a reference different-color complementary table. From a magnitude relation between density distribution in a portion of a target nonejecting nozzle and the reference preset value for each number of consecutive nonejecting nozzles, a different-color complementary table for each nozzle is determined by referring to the reference different-color complementary table for each number of consecutive nonejecting nozzles.

According to another aspect of the present invention, an image correction method for an inkjet recording apparatus for recording images by ejecting ink on a recording medium using a recording head having a plurality of nozzles for ejecting ink arranged on the recording head includes the steps of outputting a pattern for measuring recording characteristics of the recording head, determining a nonejecting nozzle from the plurality of nozzles and obtaining a density distribution corresponding to each nozzle based on the measured density of the output pattern, performing a predetermined arithmetic calculation on the obtained density distribution, determining a complementary table for each nozzle for complementing with a color different from the color corresponding to the nonejecting nozzle by comparing the calculated density distribution corresponding to the nonejecting nozzle with a reference preset value and converting image data corresponding to the nonejecting nozzle into different-color image data for ejection by another nozzle using the determined complementary table. The reference preset value is a value of the density distribution corresponding to the nonejecting nozzle in a state that sizes and density of ink drops ejected from nozzles in the vicinity of the nonejecting nozzle are constant and there is no deviation in a landing position. One of a table and a function showing a complementary amount with the different color in the state for each gradation value of input images is prepared for each number of consecutive nonejecting nozzles as a reference different-color complementary table. From a magnitude relation between density distribution corresponding to a target nonejecting nozzle and the reference preset value for each number of consecutive nonejecting nozzles, a different-color complementary table for each nozzle is determined by referring to the reference different-color complementary table for each number of consecutive nonejecting nozzles.

Further objects, features and advantages of the present invention will become apparent from the following description of the preferred embodiments with reference to the attached drawings.

BRIEF DESCRIPTION OF THE DRAWINGS

FIG. 9 is a table showing density distribution for each nozzle (before and after processing) and shading data according to a second embodiment.

DESCRIPTION OF THE PREFERRED EMBODIMENTS

Figure 1:
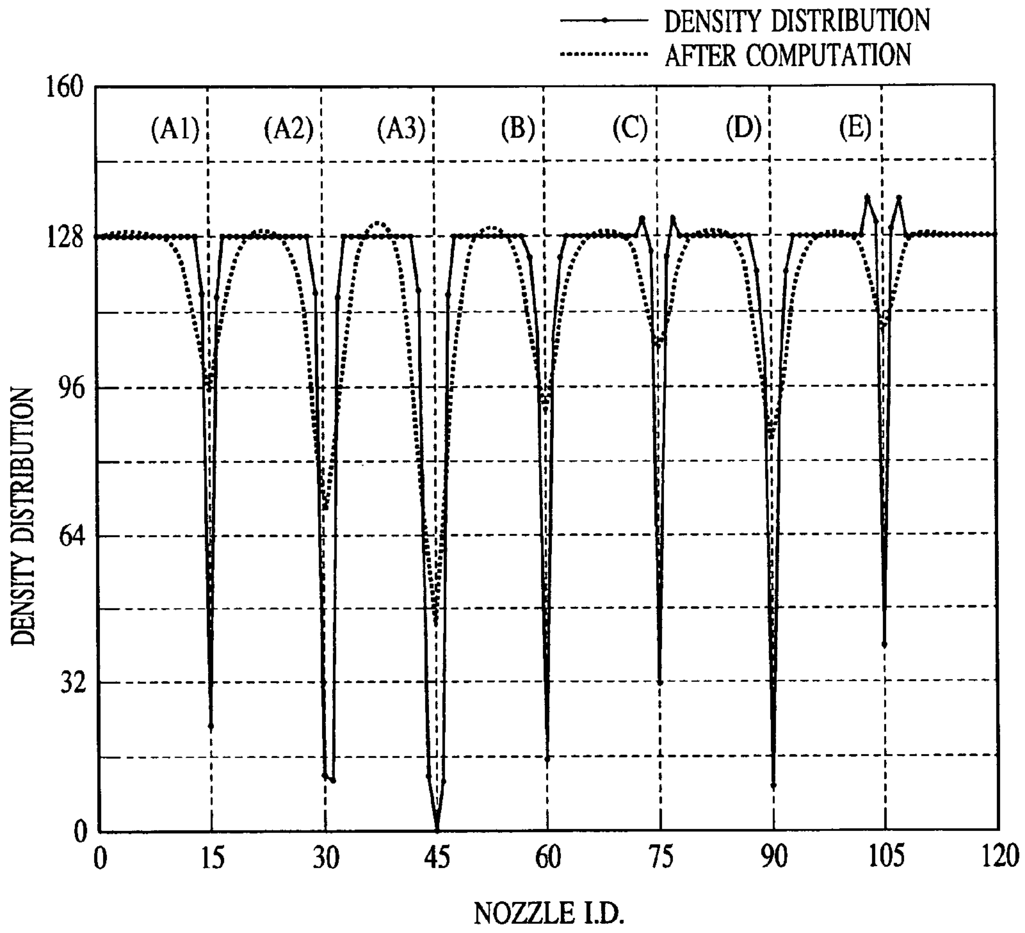
FIG. 1 is a graph showing density distribution when there are fluctuations in the ejection amount in the vicinity of a nonejecting nozzle.

Embodiments according to the present invention will be described below.

According to the present invention, a pattern for reading an ejecting state of a head is recorded and measured so as to determine the presence of a nonejecting nozzle, while density distribution, corresponding to each nozzle, is obtained so as to determine a complementary table for each nozzle so as to perform different-color complementing for the nonejecting nozzle. Such different-color complementing may preferably include inks of different color as well as inks of similar color, but different density.

Moreover, a suitable arithmetic calculation is performed on the density distribution corresponding to each nozzle so as to determine a complementary table for each nozzle to perform the different-color complementing.

Specifically, if the density distribution corresponding to each nozzle or the result of a suitable arithmetic calculation performed on the density distribution is larger than the reference set value, a complementary table is set so that the different-color complementary amount is larger than the value shown in the reference different-color complementary table. However, if the result is smaller than the reference set value, a complementary table is set so that the different-color complementary amount is smaller than the value shown in the reference different-color complementary table.

According to this specific technique, reference set values for each of 1, 2, and 3 successive nonejecting nozzles are compared with density distribution of a target nozzle, or a calculated value thereof, so as to obtain a relative number of successive nonejecting nozzles from the results, so that a complementary table for the relative number of successive nonejecting nozzles is prepared by referring to the reference different-color complementary tables for 1, 2, or 3 successive nonejecting nozzles, with suitable interpolation. The interpolation is not specifically limited, so that generally used methods such as linear interpolation or spline-curve interpolation may be used.

The above-mentioned arithmetic calculation is to calculate the density distribution corresponding to each nozzle in units of several pixels or in consideration of visual characteristics, specifically, there are averaging processing and weighted averaging processing in units of 2 to 7 pixels on 50 μm to 300 μm and 600 dpi basis. More preferable calculations include convolution integration using a VTF (visual transfer function) representing visual characteristics and convolution integration using a PSF (point spread function). These latter methods are more preferred because the visual characteristics are reflected therein. In addition, mathematically, the above-mentioned convolution integration is interchangeable with the inverse Fourier transformed value of the product of the Fourier transformed density distribution and the Fourier transformed VTF or PSF, so that any one of the methods may be used. The VTF and PSF are given by the following equations.

VTF:

$$\begin{cases} 5.05e^{-0.138f(1-e^{-0.1f})} \\ 1 \qquad (f < 5.45) \end{cases}$$

$$f[u] = \pi v l u / 180$$

Wherein vl: distance of distinct vision (mm) u: number of waves (1/mm)

PSF:

$$ae-2(x/\delta)^2$$

Wherein x: distance of distinct vision (mm) σ: dispersion (mm) a: normalization constant The distance of distinct vision (vl) in the VTF represents the distance between a recording medium and the observer's eyes, which is typically set to be 200 to 400 mm. Also, when f=5.45 or less, density comparison in separated portions is not performed, and the VTF is set to be 1.

Figure 3:
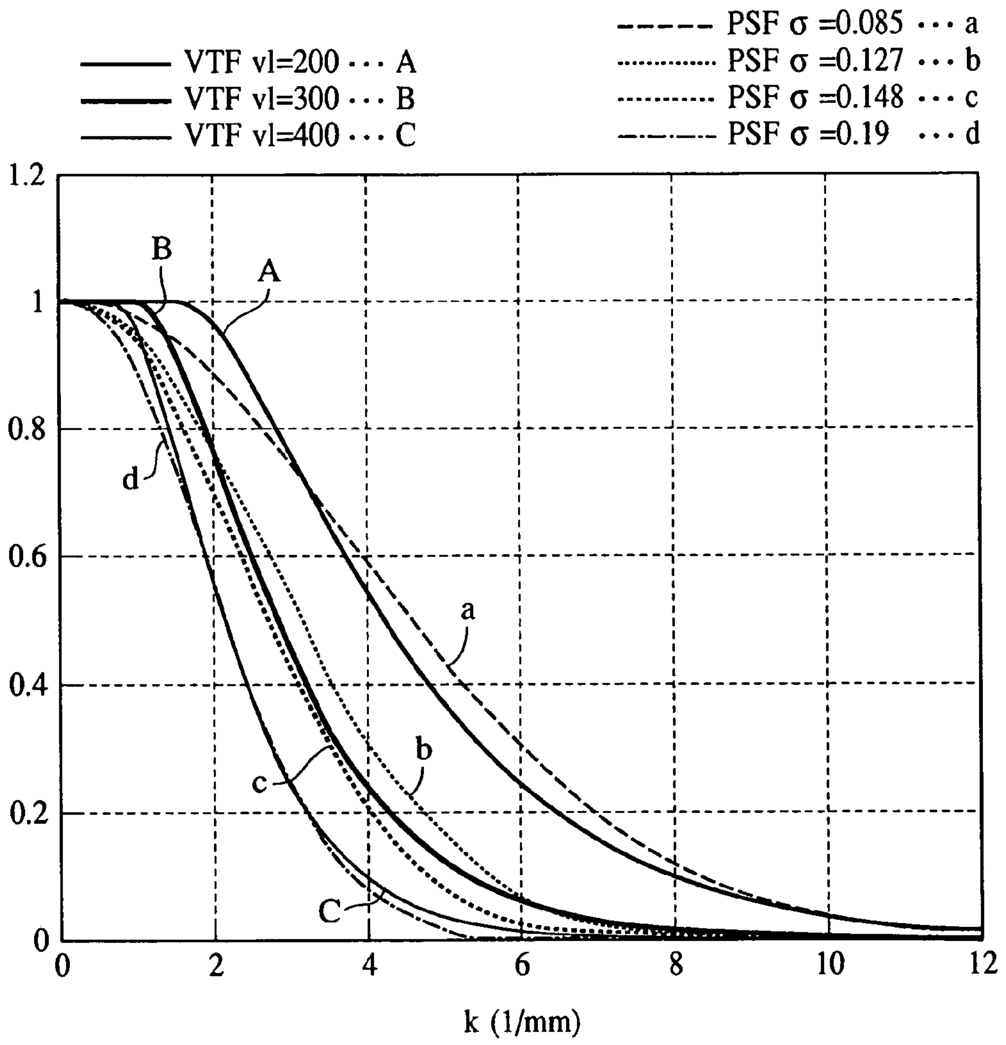
FIG. 3 is a graph showing frequency response characteristics of a visual transfer function (VTF) and a point spread function (PSF).

On the other hand, the dispersion σ in the PSF indicates the degree of broadening in the Gaussian function. Although it is not interchangeable with the vl, in view of the degree of spatial effect, a vl of 200 to 400 mm substantially corresponds to a σ of 0.085 to 0.19 mm (2 to 4.5 pixels on 600 dpi basis), so that when the PSF is used, values within the above-mentioned range may be preferable. In addition, frequency response characteristics of the VTF and PSF are shown in FIG. 3 for reference.

Next, an overview of the present invention will be described with reference to the drawings.

As described above, the solid lines of FIGS. 1 and 2 indicate the above-mentioned density distributions when the dot diameter and Y kink are changed, respectively. These graphs demonstrate that the density distribution in the nonejecting nozzle is changed corresponding to ejecting conditions on both sides of the nonejecting nozzle. This results from the effect on a nonejection region of ink dots ejected from nozzles in the vicinity of the nonejecting nozzle. When these factors are accounted for, different-color complementing of the nonejecting nozzle can be performed more efficiently. To do so, the different-color complementary table is determined by comparing a reference pre-set value with the density distribution observed for the nonejecting nozzle.

Figure 2:
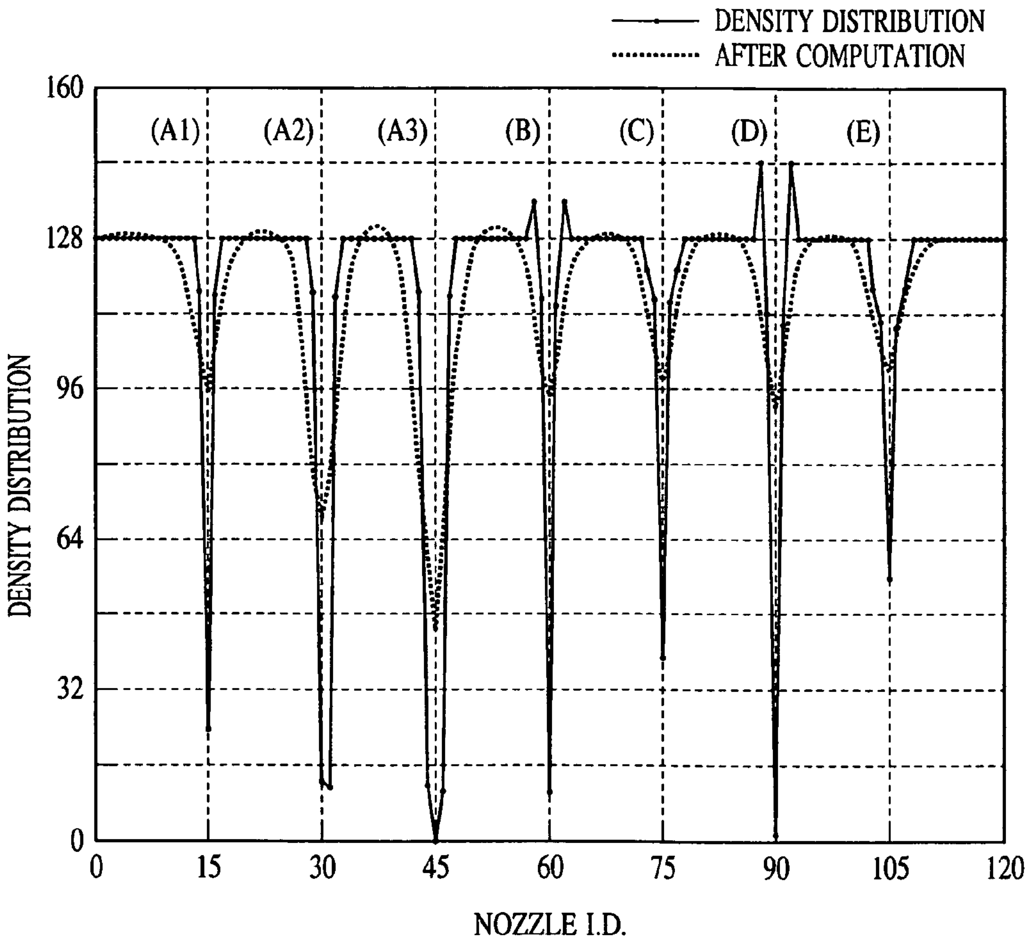
FIG. 2 is a graph showing density distribution when there are fluctuations in kink in the vicinity of a nonejecting nozzle.

The broken lines of FIGS. 1 and 2 show the arithmetically processed results on the density distributions, wherein the convolution integration is performed using the VTF formula when the distance of distinct vision (vl) is 300 mm. As shown in these drawings, when the dot diameter is changed in the nozzles on both sides of the nonejecting nozzle (examples in FIG. 1), the result of the operation in the nonejecting nozzle is also changed; however, when only the kink is changed in the nozzles on both sides of the non-ejecting nozzle (examples in FIG. 2), the result of the operation in the nonejecting nozzle is scarcely changed. Therefore, by determining the complementary amount for different-color complementing on the basis of the calculation enables the complementing to suitably account for the effect of the kink.

In determining the complementary amount, the above-mentioned reference set value indicates the density distribution in the nonejecting nozzle, or the result of the operation thereof, when the density and size of the dot recorded by the nozzles in the vicinity of the nonejecting nozzle are constant and, moreover, when there is no deviation in the landing position (kink). This situation corresponds to results (A1) through (A3) in FIGS. 1 and 2. In such situations, the reference different-color complementary table represents the actual different-color amount to be complemented. Also, the reference different-color complementary table is given as a separate table for each of a number of successive nonejecting nozzles, using the image density data in the region (gradation value) as a parameter, wherein if the result of the operation of the region corresponding to the nonejecting nozzle is larger than the reference set value regardless the number of successive nonejecting nozzles is 1 (corresponding to B and D in FIG. 1), for example, a complementary table for the nozzle is determined by referring to the reference different-color complementary tables for numbers 1 and 2 of successive nonejecting nozzles with interpolation performed therebetween. The interpolation is not specifically limited, so that the linear interpolation or nonlinear interpolation may be appropriately selected.

Along with different-color complementing, same-color complementing may be performed using an adjacent nozzle, so that more efficient complementing can be performed. In this case, the reference different-color complementary table needs to be reset as a different-color complementary table after the adjacent complementing is performed with the same color.

Furthermore, the information for each nozzle obtained by the arithmetic calculation may be used as a correction parameter for correcting density nonuniformity (shading correction); if higher spatial-frequency response is desired, a parameter for shading correction may also be calculated by performing a separate arithmetic calculation.

The pattern used for checking ejection conditions of the head is a pattern such as a nonejection-detection pattern, in which lines recorded by one nozzle are step-wise arranged, and a staggered pattern with a recording duty factor of 50%; however, it is not limited to these patterns, and may be any pattern as long as nonejection of a nozzle and density distribution for each nozzle can be checked. Also, patterns with several kinds of recording duty factors may be used so as to obtain density distribution for each nozzle. Using the patterns with plural recording duty factors enables the head shading to be performed in more detail.

The reading the pattern for checking ejection conditions is performed using a commonplace scanner. To obtain optimum results, the optical resolution of such scanners is preferably at least the same as that of the recording head. If the resolution of the reading optical system is excessively low, precise feedback cannot be achieved because the read data is not as precise. Also, the reading system may be mounted on the printer online or offline, so that it is not specifically limited.

The data read with the scanner is correlated with each nozzle and the nonejection and density distribution are detected therefrom so as to perform arithmetic calculations, such as averaging and convolution integration on the density distribution. At this time, for the nozzle determined to be nonejecting, a different-color complementary amount is determined by comparing the result calculated for the position corresponding to the nozzle with the pre-set value. The result of this operation may also be used for shading correction. In general, shading data is represented as a rate of deviation from the average density during the recording of an even pattern, so that the above-mentioned result of the operation is also used when the shading data is calculated. On the basis of the shading data for each nozzle obtained in such a manner, shading correction may be performed using a γ conversion table and gray-scale conversion function.

After performing the nonejection correction and shading correction in such a manner, either binarization or multi-level coding is performed thereon so as to actually record images by converting the data into bit map data. The above-mentioned binarization or multi-level coding is not specifically limited; however, in order to eliminate unevenness between nozzles, an error diffusion method having comparatively high frequency response may be preferable.

Embodiments according to the present invention will be described below with reference to the drawings.

First Embodiment

According to a first embodiment, gray-scale images are output using a side-shooter type thermal inkjet recording head. The resolution (nozzle density) of the recording head is 600 dpi, and the head has a length of about 303 mm with 7168 nozzles arranged thereon. The amount of ink to be ejected (ejection amount) from each nozzle is designed to be about 8 pl.

A printer having the four longitudinal multi-heads for cyan C, magenta M, yellow Y, and black K is experimentally manufactured so as to output images. The resolution of the output image is 600×600 dpi, and a one-pass recording system is adopted, in which a recording medium passes relative to the head fixed within the printer.

Various additives for the ink C, M, Y, and K are controlled so as to substantially equalize their physical properties, namely, viscosity: 1.8 cps, and surface tension: 39 dyn/cm. The driving conditions of the head are frequency: 8 kHz, voltage: 10 V, and applied pulse width: 0.8 μs. By driving under these conditions, an approximately 8 pl ink droplet is ejected at a speed of about 15 m/s.

Figure 4:
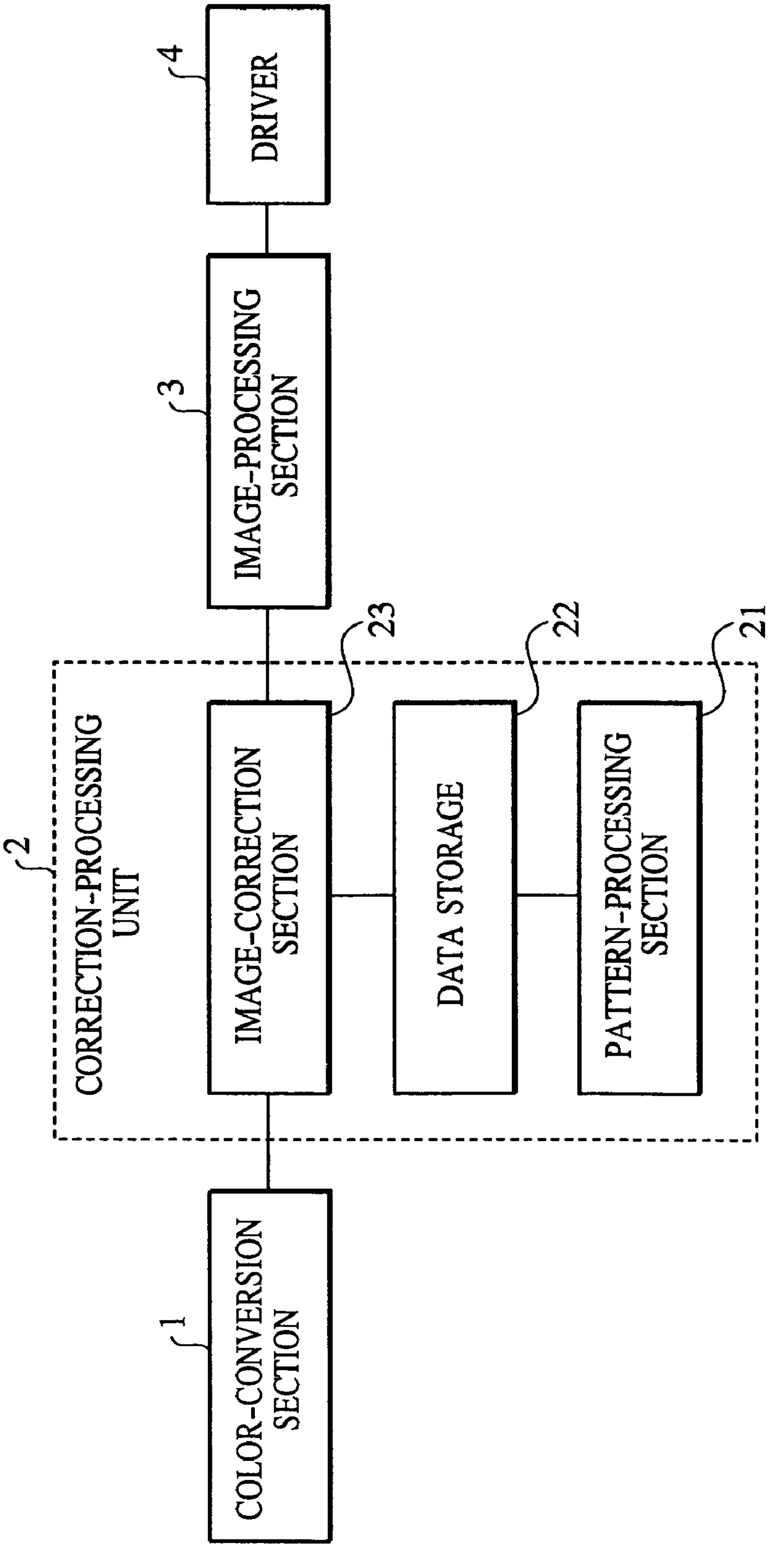
FIG. 4 is a block flow diagram showing data processing according to an embodiment of the present invention.

FIG. 4 is a block flow diagram showing data processing according to the embodiment. Referring to the drawing, a color-conversion section 1 is for performing color-conversion of input image data with 8-bit for each of R, G, and B into image data with 8-bit for each of four colors C, M, Y, and K, and the γ conversion and enlarging or contracting are performed on demand therein. A correction-processing unit 2, embodying the present invention, comprises a pattern-processing section 21, a data-storage 22, and an image-correction section 23. The pattern-processing section 21 reads a pattern for checking an ejection state of the recording head and correlates the result with each nozzle for determining a nonejecting nozzle. Furthermore, the pattern-processing section 21 performs the arithmetic calculation on density distribution data and stores the information for each nozzle into the data-storage 22. The data-storage 22 is also provided with a reference different-color complementary table for different-color complementing and the reference values calculated are stored therein. The image-correction section 23 performs the nonejection correction and shading correction by referring to the data stored in the data-storage 22. An image-processing section 3 performs the binarization, etc., and feeds the bit map data, which is converted therein, to a head driver 4 for driving the head according to the data so as to output images.

Figure 5:
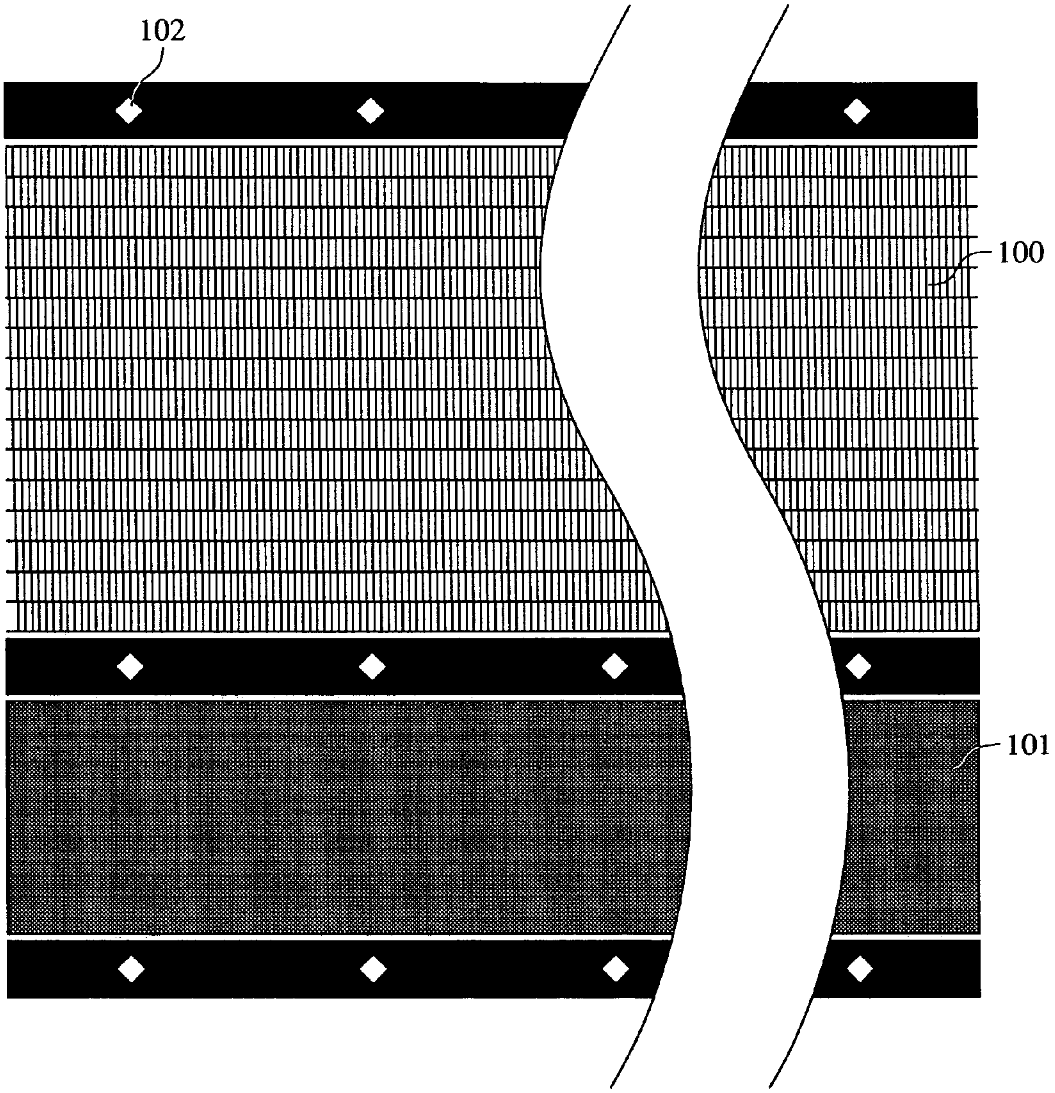
FIG. 5 is a schematic diagram for illustrating detection of a nonejecting nozzle and a shading pattern.

When printing images, first, a nonejecting-nozzle detection pattern 100 and a shading pattern 101 shown in FIG. 5 are output for each color, for four pattern-combinations in total. In the nonejecting-nozzle detection pattern 100, there are 16 horizontal rows of plural vertical lines, with each vertical line having a length of 64 pixels recorded by one nozzle. A vertical line in a subsequent row is shifted by a length equivalent to one nozzle from the vertical line in the previous row. That is, each row has 448 vertical lines associated with 448 different nozzles. The shading pattern 101 has a recording duty factor of 50% and a size of 7168×512 pixels. The nonejecting nozzle detection pattern and the shading pattern 101 are also provided with markers 102 corresponding to particular nozzle positions.

These patterns are read with a scanner with an optical resolution of 1200 dpi so as to detect nonejecting nozzles and measure density distribution. Specific methods for detecting nonejecting nozzles and measuring density distribution are shown as follows. Each marker 102 is provided for specifying a particular nozzle number, and the plural markers are arranged at intervals of 512 nozzles, i.e., 14 markers in total. The image data read with the scanner is separated into each color and converted into a gray scale for each color, which reflects color density. From the gray scale data, the position of the marker is read. In order to correlate this data into the data correlated with the nozzle position, rotation and enlarging or contracting are appropriately performed so as to correspond to the pixels equivalent to 600 dpi.

The detection of the nonejecting nozzle is performed using the nonejecting-nozzle detection pattern 100 after performing the suitable rotation and enlarging or contracting as described above. From each row of the pattern, a section equivalent to 7168×50 pixels is isolated, and furthermore, three pixels in the vicinity of a target position to be positioned by nature are to be a decision part. If the density of this decision part is substantially the same as that of a nonrecorded portion, the corresponding nozzle is determined to be nonejecting.

As for the density distribution for each nozzle, the central section of the shading pattern 101 with a recording duty factor of 50%, which is equivalent to 7168×400 pixels, is isolated, and 400 pixels for each nozzle are averaged to have the density distribution.

Figure 6:
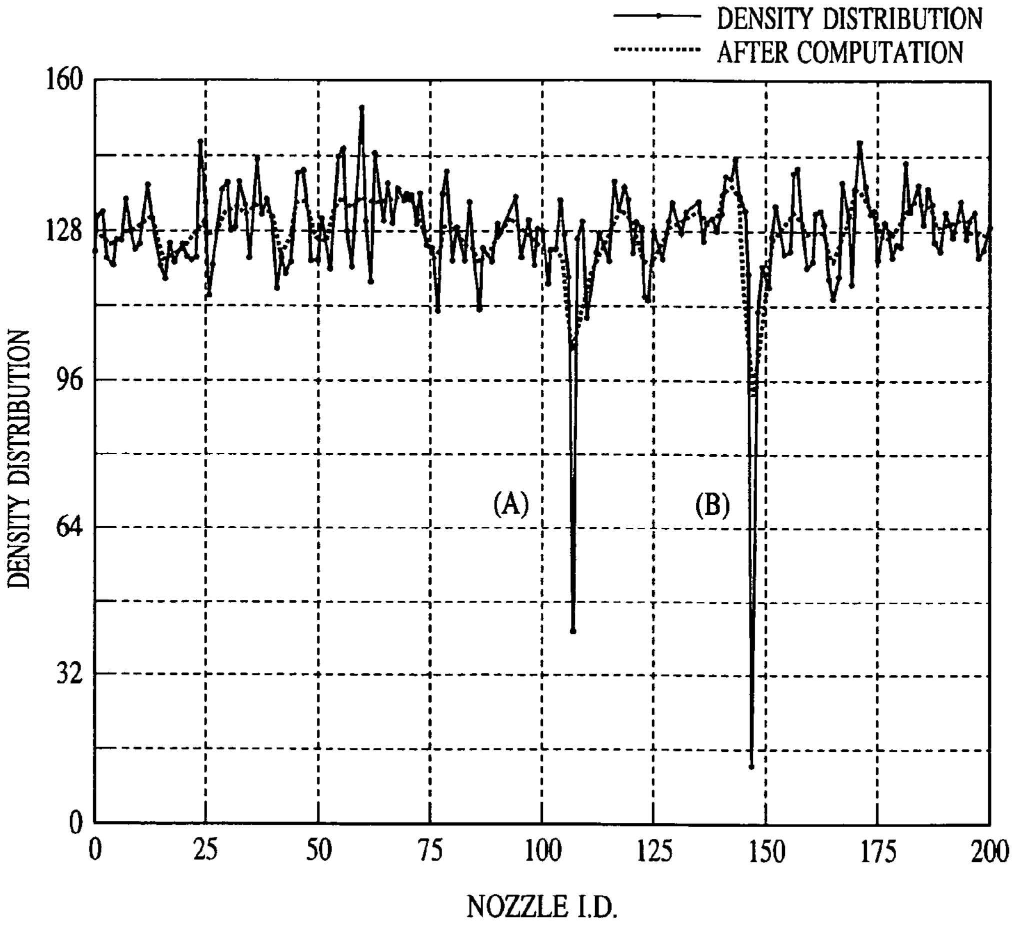
FIG. 6 is a graph showing cyan density distribution and the distribution after an arithmetic calculation according to a first embodiment.
Figure 7:
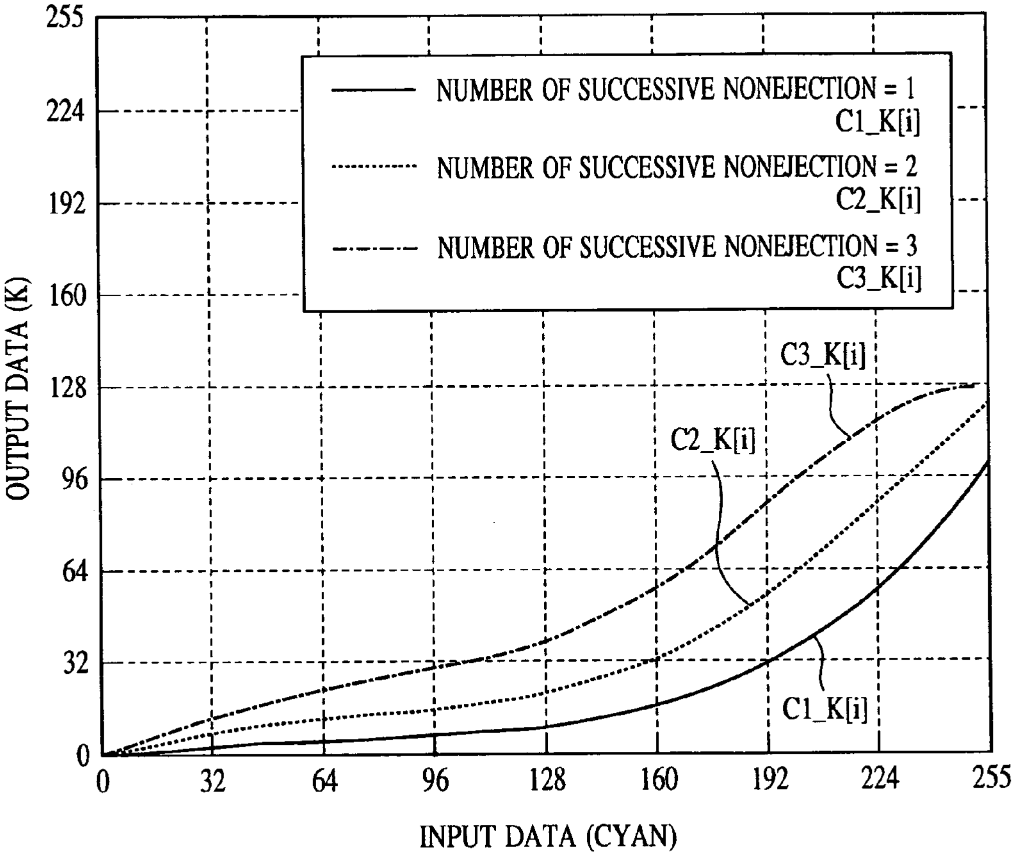
FIG. 7 is a graph showing complementary tables for complementing a nonejecting nozzle corresponding to cyan ink with black ink.

According to the embodiment, the convolution integration is performed on the density distribution using the PSF with a dispersion of 127 μm, which is equivalent to 600 dpi, 3 pixels. Part of the result (equivalent to 200 pixels) is shown in FIG. 6. The portions indicated by symbols (A) and (B) in the drawing are nonejecting nozzle portions detected by the above-mentioned nonejecting-nozzle detection, and the results of the operation thereof are 102 and 91, respectively. These results to determine the nonejecting nozzle and the calculated results of the nonejecting nozzle portions are stored within the data storage 22. According to the embodiment, the shading correction is also performed to correct unevenness, wherein the shading correction may be performed by using the above-mentioned results. On the other hand, the reference set values for 1, 2, or 3 successive nonejecting nozzles are 95, 68, and 42, respectively, and the reference different-color complementary tables (FIG. 7) corresponding to these values are set in the data storage 22 in advance. FIG. 7 shows the reference different-color complementary table of black for cyan with respect to 1, 2, or 3 successive non-ejecting nozzles. Similar reference different-color complementary tables of black for magenta, and cyan, magenta, and yellow for black are also stored in the data storage 22. However, according to the embodiment, the different-color complementing for yellow is not performed.

Figure 8:
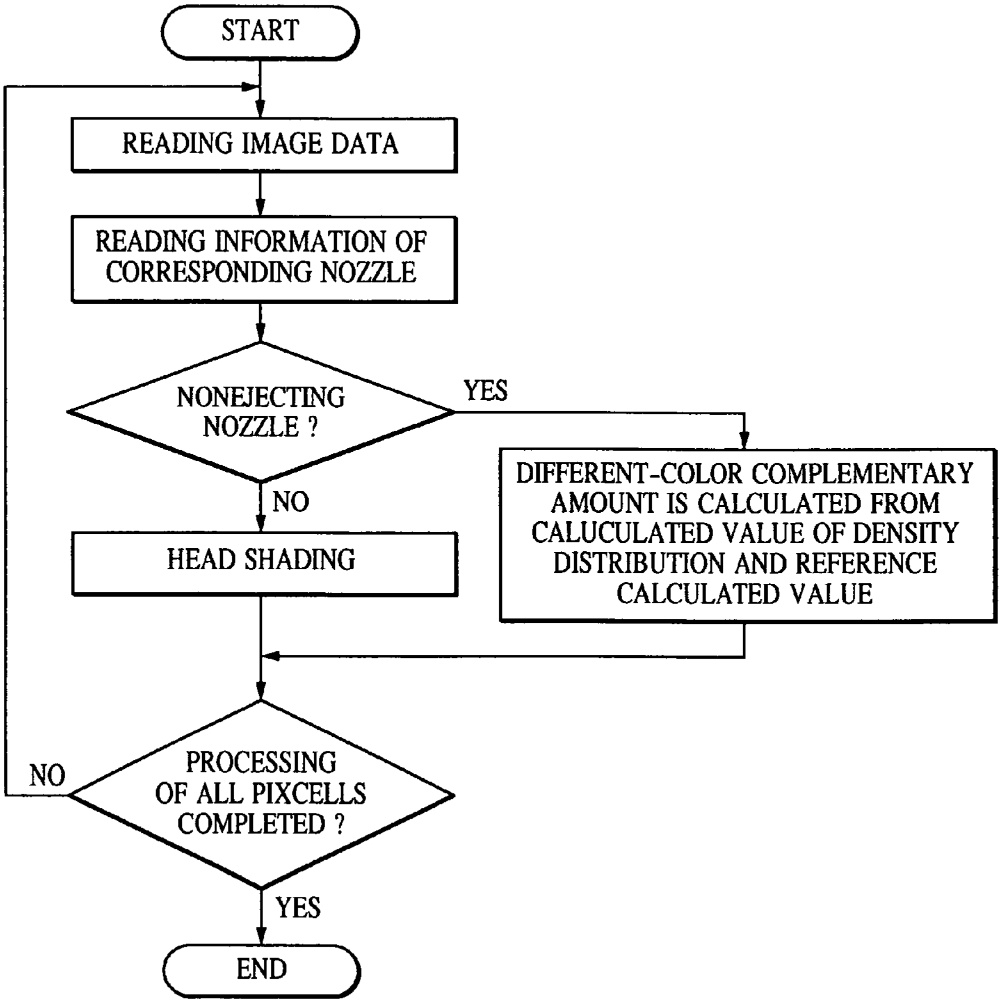
FIG. 8 is a flow chart showing correction processing according to the first embodiment.

Various kinds of correction processing are performed in the image-correction section 23 by referring to data stored in the data storage 22. Such correction processing will be described with reference to the flow in FIG. 8, wherein image data processed in the color-conversion section 1 is sequentially processed, and the image data read at first is correlated with the nozzle for recording the image data in fact. Next, the information of the correlated nozzle is recalled from the data storage 22 to determine if the nozzle is nonejecting. If the nozzle is nonejecting, the calculated value of the nozzle portion is compared with the reference-calculated value of the nonejecting nozzle. For example, the calculated value 102 of the cyan nozzle portion shown in (A) of FIG. 6 is between the reference calculated-value 95 for 1 nonejecting nozzle and the calculated value is 128 in the case of a fully-functioning nozzle. Therefore, on the image data corresponding to this nozzle, the different-color complementing is performed by adding the value (128−102)/(128−95)=0.79 times of the reference different-color complementary amount c1_k[i] (FIG. 7) for 1 successive nonejecting nozzle to the corresponding black data.

Also, the calculated value of the nozzle portion, shown in (B) of FIG. 6, is 91, which is between the reference calculated-values of 95 for 1 nonejecting nozzle and 68 for 2 successive nonejecting nozzles. That is, the relative number of successive nonejecting nozzles is calculated to be approximately 1.15. Therefore, a complementary table for this nozzle is set to a value internally dividing the reference different-color complementary table c1_k[i] for 1 nonejecting nozzle and the reference different-color complementary table c2_k[i] for 2 successive nonejecting nozzles at a ratio of 4:23, so that the nozzle is complemented in different-color form according to this complementary table. In such a manner, nonejection complementing is performed. On the other hand, if a target nozzle is not nonejecting, shading correction is preferably performed. According to the embodiment, using the calculated result of the density distribution, linear correction is performed. For example, if the calculated value of a target nozzle is 134, the density is higher than the overall average value 128 by approximately 4.7%. For correcting this, the image data corresponding to that nozzle is multiplied by 0.95.

After correcting the entire image data in such a manner, in the image-processing section 3, the binarization is performed so as to prepare the bit map data. According to the embodiment, the binarization is performed using a general error diffusion method. The bit map data are further fed to the head driver 4 so as to output corrected images.

The images obtained in such a manner are excellent with inconspicuous streaks of nonejecting portions.

Second Embodiment

In a second embodiment, images are corrected and output according to a similar method as the first embodiment; however, the convolution integration uses the VTF at the distance of distinct vision vl=250 mm, and shading corrections are additionally prepared. The embodiment will be described centering on these points.

Figure 10:
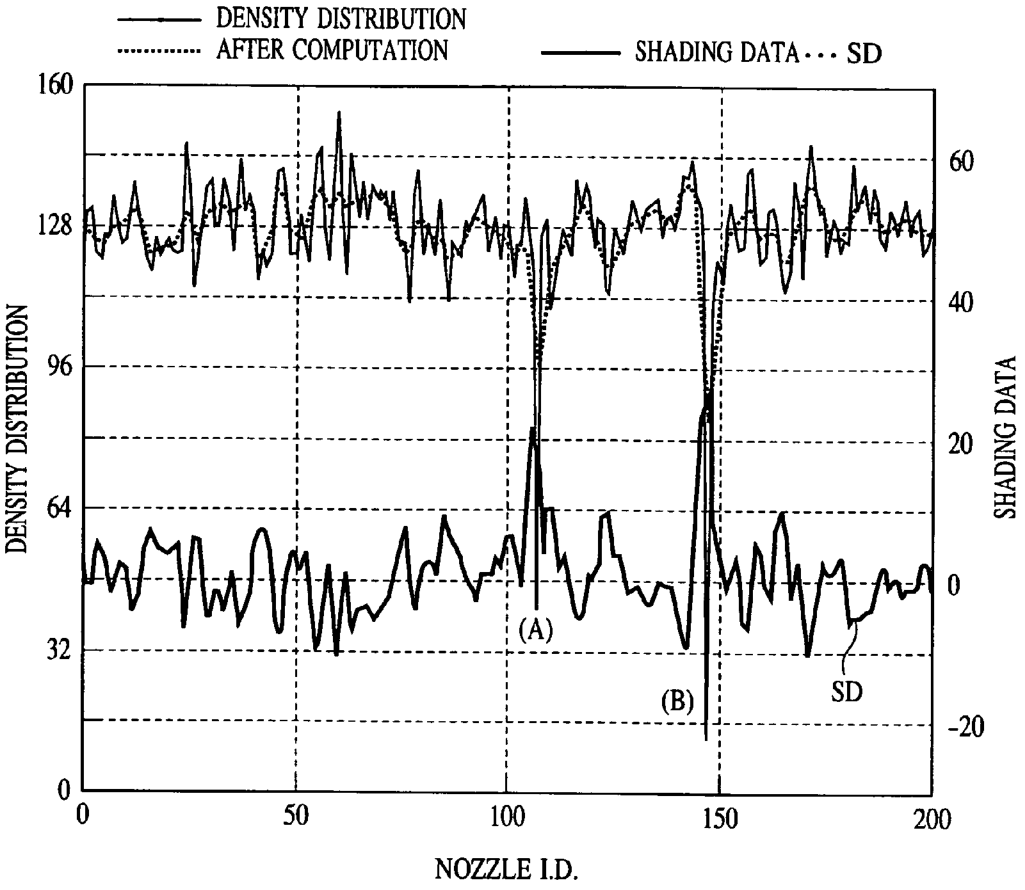
FIG. 10 is a graph showing cyan density distribution, the distribution after an arithmetic calculation, and shading data according to the first embodiment.

According to the second embodiment, the same pattern as that of the first embodiment is recorded so as to determine a nonejecting nozzle and to obtain density distribution for each nozzle. The result at this point is the same as in the first embodiment. An arithmetic calculation is then performed on the density distribution using the above-mentioned VTF formula. At this time, with the inverse Fourier transformed VTF and the density distribution, the arithmetic calculation of convolution integration is performed. The data for shading correction is then prepared as a rate of the weighted-average value of the density distribution for three pixels of each nozzle in the average value for all the nozzles other than the nonejecting nozzles. Part of the result is shown in FIG. 9. A graph of the density distribution for data extracted by 200 pixels in the same way as in the first embodiment, data after the arithmetic calculation, and shading data is shown in FIG. 10.

Figure 11:
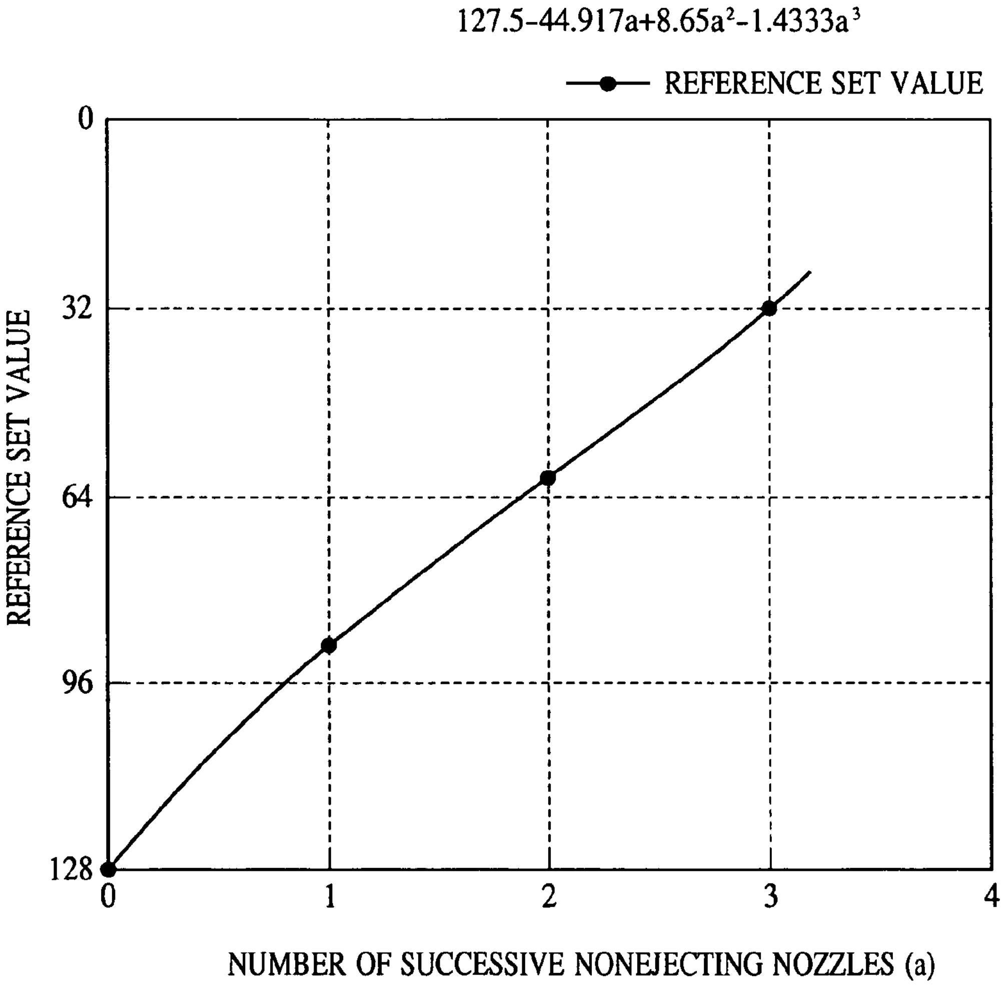
FIG. 11 is a graph showing the relationship between the number of successive nonejecting nozzles for cyan and the reference set value.

The reference set values for the 1 to 3 successive nonejecting nozzles are 90, 61, and 32, respectively. According to this embodiment, the relationship between the number of successive nonejecting nozzles and the reference set value is approximated by a cubic curve (FIG. 11) so as to determine a relative number of successive nonejecting nozzles by comparing it with the calculated result of the nonejecting nozzle portion, thereby determining the different-color complementary amount. For example, the calculated result of density distribution in the nozzle portion (A) of Nozzle I.D. 107 is 97.4. This value is correlated with 0.77 successive nonejecting nozzles by the relationship expressed in the cubic curve of FIG. 11. As a result, the different-color complementing is performed by adding a value 0.77 times as much as the reference different-color complementary table for 1 nonejecting nozzle c1_k[i] (FIG. 7) to black data. Also, the second calculated result of density distribution, in the nozzle portion (B) of Nozzle I.D. 147, is 84.0, and its number of successive nonejecting nozzles is correlated with 1.18 by the above-mentioned cubic curve. Therefore, to the nozzle portion (B), black data is added, which correspond to a value internally dividing the reference different-color complementary table c1_k[i] for 1 nonejecting nozzle and the reference different-color complementary table c2_k[i] for 2 successive nonejecting nozzles at a ratio of 9:41, so that the different-color complementing is performed.

After correcting the entire image data in such a manner, the binarization is performed in the same way as in the first embodiment so as to prepare the bit map data, thereby outputting corrected images.

The images obtained in such a manner are excellent with inconspicuous streaks from nonejecting portions.

As described above, according to the present invention, a pattern for reading an ejecting state of a head is measured and recorded so as to determine the presence of a nonejecting nozzle by the result while density distribution corresponding to each nozzle is obtained. Based on the density distribution, or the result of a suitable arithmetic calculation performed on the density distribution, a complementary amount to perform the different-color complementing is determined, so that image defects, which cannot be corrected by a conventional method, are reduced. Also, as a result, there is an advantage that a number of manufactured heads that are actually usable is increased.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image correction method for an inkjet recording apparatus for recording images by ejecting ink on a recording medium using a recording head having a plurality of nozzles for ejecting ink arranged on the recording head, the image correction method comprising the steps of:

outputting a pattern for measuring recording characteristics of the recording head;

determining a nonejecting nozzle from the plurality of nozzles and obtaining a density distribution corresponding to each nozzle based on the measured density of the output pattern;

determining a complementary table for each nozzle from a reference preset value of the density distribution corresponding to the nonejecting nozzle in a state that the sizes and density of ink drops ejected from nozzles in the vicinity of the nonejecting nozzle are constant and there is no deviation in a landing position, by comparing the obtained density distribution thereof with reference preset value, the complementary table complementing with a color different from the color corresponding to the nonejecting nozzle; and converting image data corresponding to the nonejecting nozzle into different-color image data for ejection by another nozzle using the determined complementary table, wherein one of a table and a function showing a complementary amount with the different color in the state for each gradation value of input images is prepared for each number of consecutive nonejecting nozzles as a reference different-color complementary table, and wherein from a magnitude relation between density distribution in a portion of a target nonejecting nozzle and the reference preset value for each number of consecutive nonejecting nozzles, a different-color complementary table for each nozzle is determined by referring to the reference different-color complementary table for each number of consecutive nonejecting nozzles.

2. A method according to claim 1, wherein the output pattern is read by an optical scanner.

3. A method according to claim 1, wherein the color different from the color corresponding to the nonejecting nozzle is of the same hue but different density.

4. A method according to claim 1, wherein three reference different-color complementary tables are prepared for each nozzle.

5. An image correction method for an inkjet recording apparatus for recording images by ejecting ink on a recording medium using a recording head having a plurality of nozzles for ejecting ink arranged on the recording head, the image correction method comprising the steps of:

outputting a pattern for measuring recording characteristics of the recording head;

determining a nonejecting nozzle from the plurality of nozzles and obtaining a density distribution corresponding to each nozzle based on the measured density of the output pattern;

performing a predetermined arithmetic calculation on the obtained density distribution;

determining a complementary table for each nozzle from a reference preset value of the density distribution corresponding to the nonejecting nozzle in a state that the sizes and density of ink drops ejected from nozzles in the vicinity of the nonejecting nozzle are constant and there is no deviation in a landing position, by comparing the obtained density distribution thereof with reference preset value, the complementary table complementing with a color different from the color corresponding to the nonejecting nozzle; and converting image data corresponding to the nonejecting nozzle into different-color image data for ejection by another nozzle using the determined complementary table, wherein one of a table and a function showing a complementary amount with the different color in the state for each gradation value of input images is prepared for each number of consecutive nonejecting nozzles as a reference different-color complementary table, and wherein from a magnitude relation between density distribution corresponding to a target nonejecting nozzle and the reference preset value for each number of consecutive nonejecting nozzles, a different-color complementary table for each nozzle is determined by referring to the reference different-color complementary table for each number of consecutive nonejecting nozzles.

6. A method according to claim 5, wherein the predetermined arithmetic calculation comprises calculating one of an average value and a weighted average value in a range of 50 μm to 300 μm.

7. A method according to claim 5, wherein the predetermined arithmetic calculation comprises calculating one of convolution integration using a VTF (visual transfer function) and convolution integration using a PSF (point spread function).

8. A method according to claim 5, wherein the output pattern is read by an optical scanner.

9. A method according to claim 5, wherein the color different from the color corresponding to the nonejecting nozzle is of the same hue but different density.

10. A method according to claim 5, wherein three reference different-color complementary tables are prepared for each nozzle.

* * * * *

UNITED STATES PATENT AND TRADEMARK OFFICE

CERTIFICATE OF CORRECTION

PATENT NO. : 7,327,503 B2
APPLICATION NO. : 10/281967
DATED : February 5, 2008
INVENTOR(S) : Yashima et al.

It is certified that error appears in the above-identified patent and that said Letters Patent is hereby corrected as shown below:

ON THE TITLE PAGE:
At Item (75), Inventors, "Noribuma Koitabashi, Kanagawa (JP);" should read --Noribumi Koitabashi, Kanagawa (JP);--.

IN THE DRAWINGS:
Sheet No. 8, Figure 8, "CALUCULATED" should read --CALCULATED--, and "PIXCELLS" should read --PIXELS--.

COLUMN 6:
Line 35, "ae-2(x/δ)$^2$" should read --$ae^{-2\left(\frac{x}{\delta}\right)^2}$--.

COLUMN 7:
Line 64, "reading" should read --reading of--.

Signed and Sealed this

Tenth Day of March, 2009

JOHN DOLL
*Acting Director of the United States Patent and Trademark Office*